(12) United States Patent
Lei

(10) Patent No.: US 11,451,078 B2
(45) Date of Patent: Sep. 20, 2022

(54) ELECTRIC TOOL POWER SUPPLY HAVING VEHICLE STARTING FUNCTION

(71) Applicant: SHENZHEN CARKU TECHNOLOGY CO., LIMITED, Guangdong (CN)

(72) Inventor: Yun Lei, Guangdong (CN)

(73) Assignee: SHENZHEN CARKU TECHNOLOGY CO., LIMITED, Shenzhen (CN)

( * ) Notice: Subject to any disclaimer, the term of this patent is extended or adjusted under 35 U.S.C. 154(b) by 0 days.

(21) Appl. No.: 17/291,223

(22) PCT Filed: May 8, 2019

(86) PCT No.: PCT/CN2019/086017
§ 371 (c)(1),
(2) Date: May 4, 2021

(87) PCT Pub. No.: WO2020/098234
PCT Pub. Date: May 22, 2020

(65) Prior Publication Data
US 2021/0376640 A1    Dec. 2, 2021

(30) Foreign Application Priority Data

Nov. 13, 2018  (CN) .......................... 201821867442.6

(51) Int. Cl.
*H02J 7/00*        (2006.01)
*H01M 10/42*    (2006.01)
(Continued)

(52) U.S. Cl.
CPC ....... *H02J 7/0063* (2013.01); *H01M 10/4257* (2013.01); *H01M 10/441* (2013.01);
(Continued)

(58) Field of Classification Search
CPC .......... H02J 7/0063; H02J 7/0014; H02J 7/00; H01M 50/204; H01M 10/4257; H01M 10/441; H01M 10/42; H01M 10/44
See application file for complete search history.

(56) References Cited

U.S. PATENT DOCUMENTS

| 2002/0171391 A1 | 11/2002 | Batts-Gowins |
| 2012/0068662 A1 | 3/2012 | Durando et al. |

(Continued)

FOREIGN PATENT DOCUMENTS

| CN | 205017056 U | 2/2016 |
| CN | 205791737 U | 12/2016 |

(Continued)

OTHER PUBLICATIONS

International Search Report issued in corresponding International Application No. PCT/CN2019/086017, dated Aug. 5, 2019.
(Continued)

*Primary Examiner* — Robert L Deberadinis
(74) *Attorney, Agent, or Firm* — Hauptman Ham, LLP

(57) ABSTRACT

The present disclosure discloses an electric tool power supply having a vehicle starting function. The electric tool power supply comprises a power supply component, a first output interface, and a second output interface. The power supply component is configured to store and provide electrical energy. The first output interface is electrically coupled to the power supply component. The power supply component is configured to provide operating voltage for an electric tool through the first output interface when the electric tool power supply is installed on the electric tool. The second output interface is electrically coupled to the power supply component. The power supply component is configured to output instantaneous large-current to a starter of a vehicle through the second output interface when the electric tool power supply is installed on the vehicle, so as to start the starter.

10 Claims, 2 Drawing Sheets

(51) Int. Cl.
*H01M 10/44* (2006.01)
*H01M 50/204* (2021.01)
(52) U.S. Cl.
CPC ......... *H01M 50/204* (2021.01); *H02J 7/0014* (2013.01); *H01M 2010/4271* (2013.01)

(56) References Cited

U.S. PATENT DOCUMENTS

2013/0241488 A1  9/2013  Dao
2014/0139175 A1  5/2014  Gonzalez

FOREIGN PATENT DOCUMENTS

| | | |
|---|---|---|
| CN | 206180643 U | 5/2017 |
| CN | 108377023 A | 8/2018 |
| JP | H06-253463 A | 9/1994 |
| JP | H09-191564 A | 7/1997 |
| JP | 2009-187953 A | 8/2009 |
| JP | 2011-161603 A | 8/2011 |
| JP | 2013-131453 A | 7/2013 |
| KR | 20180046056 A | 5/2018 |

OTHER PUBLICATIONS

The Extended European Search Report issued in corresponding EP Application No. EP19884963.0, dated Nov. 18, 2021.
The First Office Action issued in corresponding JP Application No. JP2021-525653, dated Apr. 25, 2022.
The First Office Action issued in corresponding CA Application No. 3,119,391, dated May 30, 2022.

ELECTRIC TOOL POWER SUPPLY HAVING VEHICLE STARTING FUNCTION

CROSS-REFERENCE TO RELATED APPLICATION(S)

The present application is a National Phase of International Application No. PCT/CN2019/086017, filed on May 8, 2019, which claims priority to and the benefit of Chinese Patent Application No. 201821867442.6, filed on Nov. 13, 2018, the entire disclosure of which is hereby incorporated by reference in its entirety.

TECHNICAL FIELD

The present disclosure relates to the technology field of electric tool batteries, and in particular to an electric tool power supply having a vehicle starting function.

BACKGROUND

With the development of battery material technology, the capacity of the battery has been greatly improved, and its application range has been extended from some low-power electronic electrical devices to some high-power power electrical devices, such as electric tool tools (also known as electric power tools, or power tools).

However, the performance of the existing electric tool battery is relatively single, that is, it can only be used to supply for the electric tool. When the electric tool is in an idle state (that is, the electric tool is not in use), the battery is in an idle state, which makes the utilization rate of the electric tool battery low. If the battery is not in use for a long time, the capacity and service life of the battery will decrease, which will affect the performance of the battery.

SUMMARY

The embodiment of the present disclosure discloses an electric tool power supply having a vehicle starting function, which can be used to ignite and start a vehicle, thereby making the electric tool battery have multi-purpose and improving the utilization rate of the battery.

The implementation of the present disclosure discloses an electric tool power supply having a vehicle starting function, which includes a power supply component, a first output interface and a second output interface. The power supply component is configured to store and provide electrical energy. The first output interface is electrically coupled to the power supply component, where the power supply component is configured to provide operating voltage for an electric tool through the first output interface when the electric tool power supply is installed on the electric tool. The second output interface is electrically coupled to the power supply component, where the power supply component is configured to output instantaneous large-current to a starter of a vehicle through the second output interface when the electric tool power supply is installed on the vehicle, so as to start the starter.

BRIEF DESCRIPTION OF THE DRAWINGS

In order to illustrate the technical solutions in the implementations of the present disclosure more clearly, the accompanying drawings that need to be used in the implementations will be briefly introduced below. It is obvious that the accompanying drawings in the following description only illustrate some implementations of the present disclosure. A person of ordinary skill in the art may also obtain other drawings based on these accompanying drawings without paying any creative efforts.

DETAILED DESCRIPTION

The technical solutions in the implementations of the present application will be described clearly and completely in combination with the accompanying drawings in the implementations of the present application. Obviously, the described implementations are only part of the implementations of the present application, rather than all the implementations. Based on the implementations in the present disclosure, all other implementations obtained by those of ordinary skill in the art without making creative work fall within the protection scope of the present disclosure.

The singular forms of "a", "described" and "the" used in the implementations of the present disclosure and the appended claims are also intended to include plural forms, unless the context clearly indicates other meanings. It should also be understood that the term "and/or" used herein refers to and includes any or all possible combinations of one or more associated listed items.

When a component is considered to be "connected" to another component, it may be directly connected to the another component or an intermediate component may be present at the same time. Unless otherwise defined, all technical and scientific terms used herein have the same meaning as those commonly understood by those skilled in the art of the present disclosure. Unless otherwise defined, all technical and scientific terms used herein have the same meaning as those commonly understood by those skilled in the art of the present disclosure. The terms used in the description of the present disclosure are only for the purpose of describing the specific implementations, and are not intended to limit the present disclosure.

Figure 1:
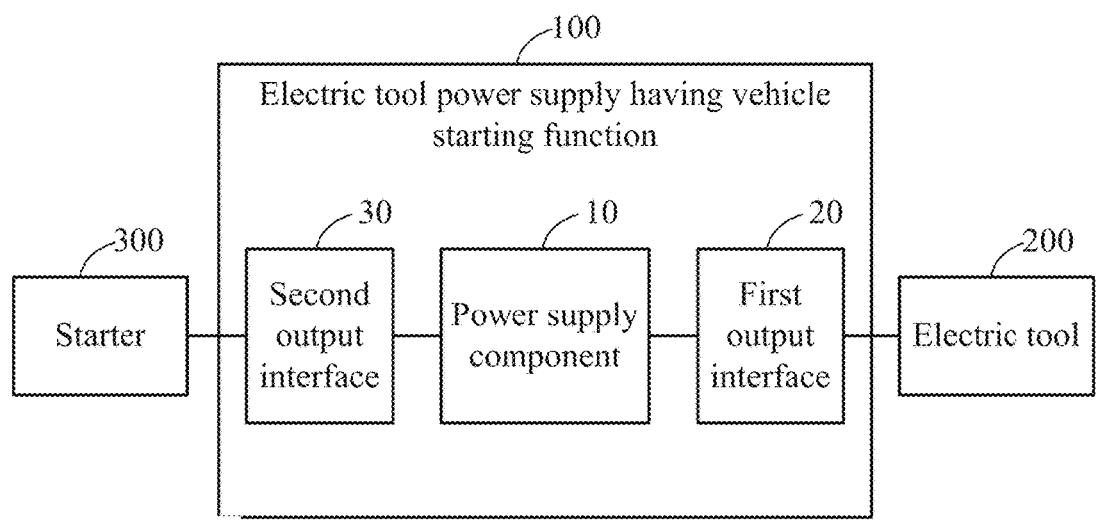
FIG. 1 is a schematic block diagram of an electric tool power supply having a vehicle starting function according to an implementation of the present disclosure.

Please refer to FIG. 1, which is a schematic block diagram of an electric tool power supply 100 having a vehicle starting function according to an implementation of the present disclosure. The electric tool power supply 100 is detachably installed on an electric tool 200 (such as an electric drill, an electric wrench, an electric screwdriver, etc.), and is configured to provide operating voltage for the electric tool 200. In addition, the electric tool power supply 100 can also be detachably installed in a vehicle and electrically coupled to a starter 300 in the vehicle to start the vehicle. The starter 300 may be a motor. When starting, the electric tool power supply 100 drives the motor to work, and then the motor drives an engine of the vehicle to work, thereby completing the starting of the vehicle.

Specifically, the electric tool power supply 100 includes a power supply component 10, a first output interface 20 and a second output interface 30. The power supply component 10 is configured to store and provide electrical energy. The first output interface 20 is electrically coupled to the power supply component 10. When the electric tool power supply 100 is installed on the electric tool 200, the power supply component 10 is configured to provide the operating voltage for the electric tool 200 through the first output interface 20. The second output interface 30 is electrically coupled to the power supply component 10. When the electric tool power supply 100 is installed on the vehicle, the power supply component 10 is configured to output instantaneous large-current to the starter 300 of the vehicle through the second output interface 30, so as to start the starter 300.

The electric tool power supply 100 disclosed in the present disclosure is provided with the first output interface 20 and the second output interface 30, which can not only provide the operating voltage for the electric tool, but also can be served as a starting power supply of the vehicle to start the vehicle. That is, a function of ignition and starting for fuel vehicles is added to the electric tool power supply, thereby improving the utilization rate and economical practicability of the electric tool power supply. In addition, the battery damage caused by long-term non-use of the electric tool power supply is avoided.

In some implementations, the first output interface 20 includes but is not limited to a connector, a wire clip, a pin, a socket, etc., which is not specifically limited here. When in use, the first output interface 20 can be connected to a connection terminal of the electric tool 200. When the electric tool power supply 100 needs to be removed from the electric tool 200, the first output interface 20 can be separated from the connection terminal of the electric tool 200. The second output interface 30 is similar to the first output interface, including but not limited to a connector, a wire clip, a pin, a socket, etc., which is not specifically limited here. When in use, the second output interface 30 can be connected to a connection terminal of the starter 300. When the electric tool power supply 100 needs to be removed from the vehicle, the second output interface 30 can be separated from the connection terminal of the starter 300.

Figure 2:
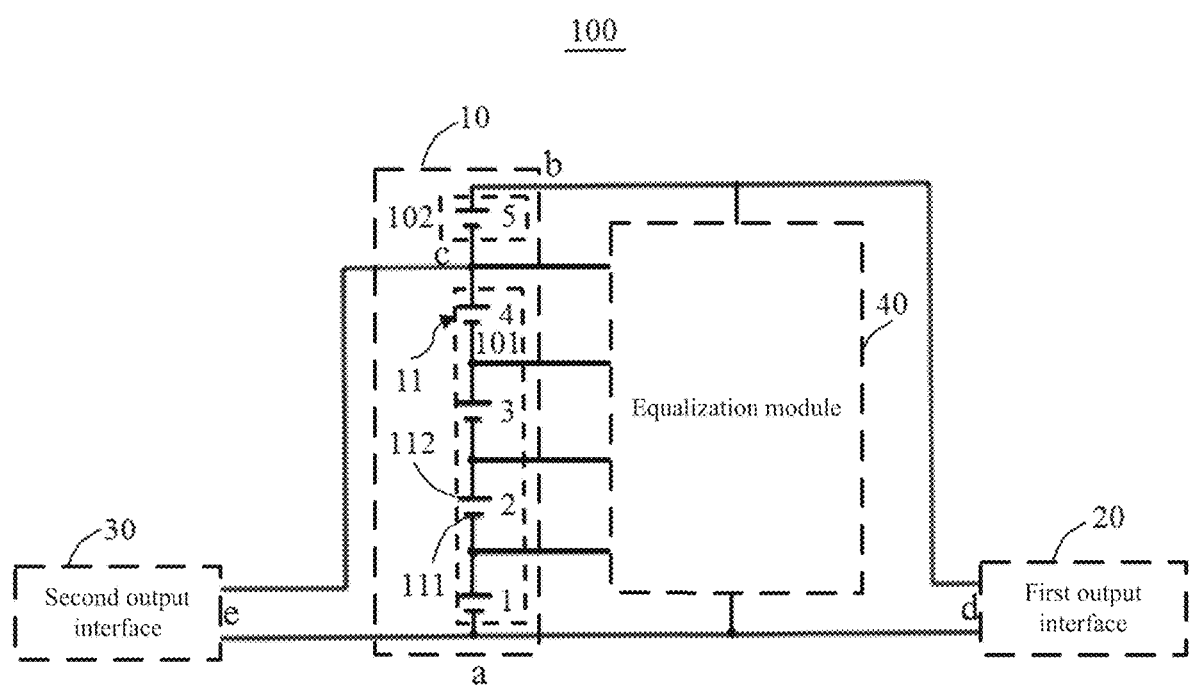
FIG. 2 is a schematic block diagram of an electric tool power supply having a vehicle starting function according to another implementation of the present disclosure.

Please refer to FIG. 2, which is a schematic block diagram of an electric tool power supply 100 having a vehicle starting function according to another implementation of the present disclosure. In some implementations, the power supply component 10 includes a common terminal "a", a first output terminal "b", a second output terminal "c", a first battery pack 101, and a second battery pack 102. The first battery pack 101 and the second battery pack 102 are coupled in series. The first battery pack 101 is electrically coupled between the common terminal "a" and the second output terminal "c". The second battery pack 102 is electrically coupled between the first output terminal "b" and the second output terminal "c". The first output interface 20 includes two first connection terminals "d" that are electrically coupled to the common terminal "a" and the first output terminal "b" in a one-to-one correspondence. The second output interface 30 includes two second connection terminals "e" that are electrically coupled to the common terminal "a" and the second output terminal "c" in a one-to-one correspondence.

In some implementations, the first battery pack 101 includes a plurality of battery modules 11 coupled in series, and the second battery pack 102 includes at least one battery module 11. In this implementation, each battery module 11 may include one or more energy storage units. When the battery module 11 includes a plurality of energy storage units, the plurality of energy storage units of the battery module 11 are coupled in series or in parallel. It can be understood that the number of battery modules 11 included in the power supply component 10 and the number of energy storage units included in each battery module 11 can be set according to specific design requirements, which are not limited herein.

The energy storage unit may adopt the main popular energy modules at present, such as a lead-acid battery, a nickel-hydrogen battery, a lithium iron phosphate battery, a lithium cobalt oxide battery, a lithium titanate battery, a super capacitor power battery, a lithium-ion capacitor, a ternary polymer lithium battery, or other energy modules that can store or provide electrical energy. In this implementation, the energy storage unit is preferably a lightweight, energy-saving and environment-friendly lithium-ion battery cell.

In this implementation, the plurality of battery modules 11 are coupled in series in order, and each battery module 11 includes a first electrode terminal 111 and a second electrode terminal 112. As illustrated in FIG. 2, in some implementations, the first battery pack 101 includes four battery modules 11 coupled in series. The second battery pack 102 includes one battery module 11. The first electrode terminal 111 may be a negative terminal, and the second electrode terminal 112 may be a positive terminal. Correspondingly, the common terminal "a" is the first electrode terminal 111 of the first battery module 11. The first output terminal "b" is the second electrode terminal 112 of the fifth battery module 11, and the second output terminal "c" is the second electrode terminal 112 of the fourth battery module 11 or the first electrode terminal 111 of the fifth battery module 11. It can be understood that the first electrode terminal 111 may also be a positive terminal, and the second electrode terminal 112 may also be a negative terminal.

In this implementation, each battery module 11 is a lithium-ion battery cell, and its rated voltage is about 3.7V. In this way, when the electric tool power supply 100 is installed on the electric tool 200, it is capable of outputting operating voltage of 20V. When the electric tool power supply 100 is installed in the vehicle and coupled to the starter 300, it is capable of outputting a starting voltage of 12V-16V.

Figure 3:
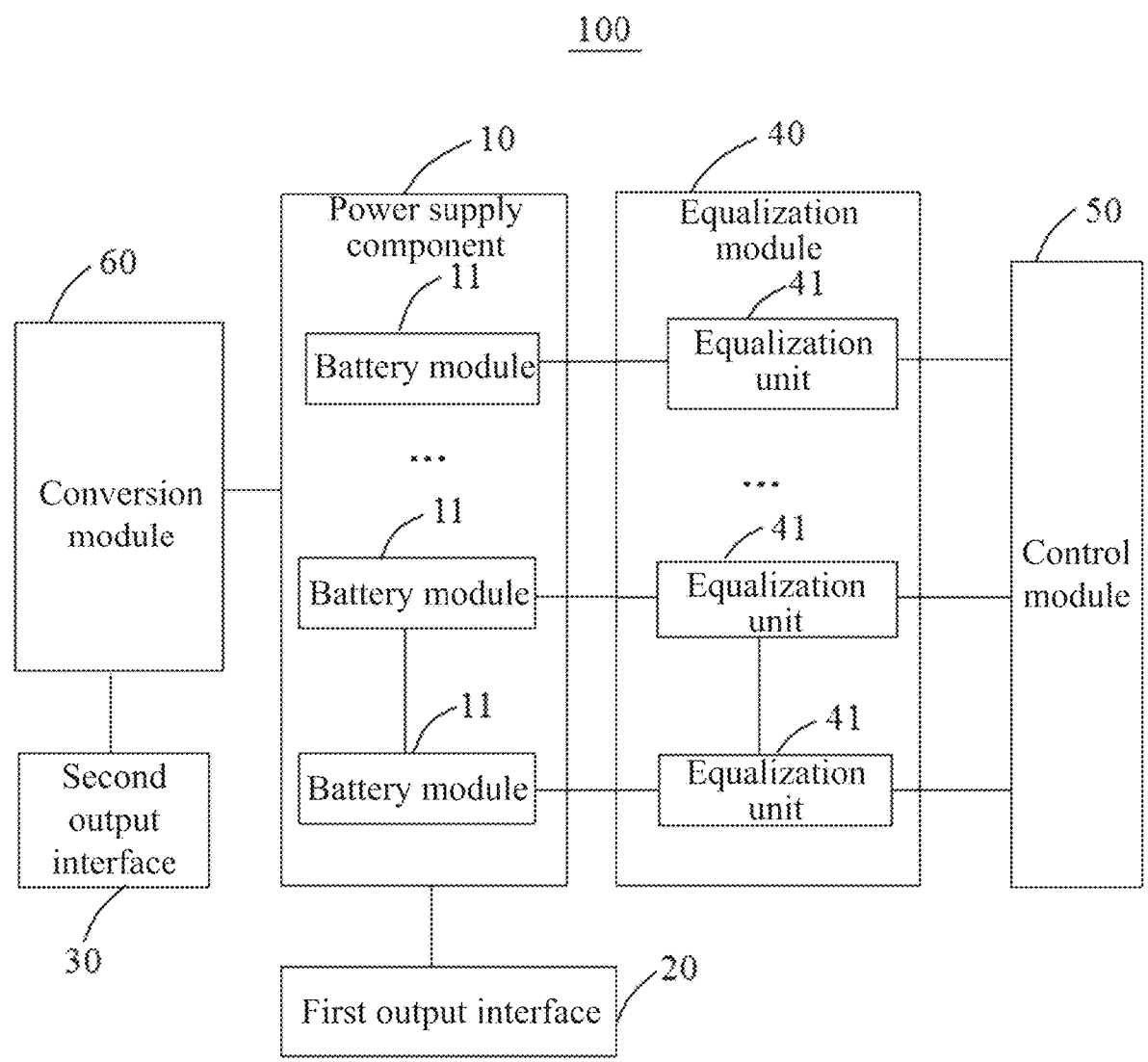
FIG. 3 is a schematic block diagram of an electric tool power supply having a vehicle starting function according to yet another implementation of the present disclosure.

Please refer to FIG. 3, which is a schematic block diagram of an electric tool power supply 100 having a vehicle starting function according to yet another implementation of the present disclosure. In some implementations, the electric tool power supply 100 further includes an equalization module 40 and a control module 50. The equalization module 40 includes a plurality of equalization units 41 that are electrically coupled to output terminals (the positive terminals 112) of the plurality of battery modules 11 one by one. That is, the number of the equalization units 41 is the same to the number of the battery modules 11, and there is a one-to-one correspondence.

The control module 50 is electrically coupled to each equalization unit 41 for controlling an operating state of each equalization unit 41. Specifically, when the voltage of one or more battery modules 11 in the power supply component 10 is higher than that of other battery modules 11 in the power supply component 10, the control module 50 turns on the equalization unit(s) 41 coupled to the battery module(s) 11 having the higher voltage, so as to perform equalization control on the voltage of the battery module 11 having the higher voltage. The equalization unit 41 discharges its corresponding battery module 11 when it is turned on (in working state).

In this implementation, the control module 50 is configured to control the equalization module 40 to perform equalization control on the voltage of the battery module 11 having the higher voltage during a charging process of the power supply component 10. For example, when charging the power supply component 10, if the voltage of a certain battery module 11 is higher, the corresponding equalization unit 41 will be controlled to start working until the higher voltage battery module 11 is equal to the other battery modules 11 in voltage, and then the corresponding equalization unit 41 will stop working. That is, the battery module 11 having the higher voltage is discharged while being charged, so that the charging speed of the battery module 11 having the higher voltage is lower than that of the other battery modules 11. Therefore, during the charging process, the voltage of the battery module 11 having the higher voltage is adjusted to be consistent with the voltage of other battery modules 11.

It should be noted that due to the individual differences of the battery cell and the different usage environments, the power imbalance of each battery module 11 is caused. This imbalance will become greater and greater as the battery life cycle increases, which will seriously affect the service life of the power supply component 10. Therefore, in order to prolong the service life of the power supply component, the power supply component 10 needs to be balanced during use, so that the power of each battery is the same as far as possible.

Therefore, in the electric tool power supply 100 disclosed in this implementation, since the equalization module 40 is provided, when the control module 50 detects that the voltage of one or more battery modules 11 is unbalanced, it can turn on the corresponding equalization unit 41 to equalize the corresponding battery modules 11, so as to improve the consistency among the plurality of battery modules 11, thereby increasing the service life of the power supply component 10.

In some implementations, the electric tool power supply 100 further includes a conversion module 60 that is electrically coupled between the second output terminal "c" of the power supply component 10 and one of the second connecting terminals "e" of the second output interface 30. The conversion module 60 is configured to convert the electric energy output by the power supply component 10 into instantaneous large-current when receiving a starting signal, and output the instantaneous large-current to the starter 300 through the second output interface 30, to enable the starter 300 to start the vehicle. The instantaneous large-current can reach more than 1000 A, which can be set according to actual usage conditions, and is not specifically limited here.

In this implementation, the starting signal may be generated when a vehicle key of the vehicle is in a certain gear, for example, when the vehicle key of the vehicle is in a "START" gear, the vehicle generates the starting signal. In other implementations, the starting signal may also be generated according to a user's operation instructions, for example, when the user presses a certain switch, the starting signal is generated.

In this implementation, the control module 50 may be a single-chip microcomputer, a micro control unit (MCU), etc. The control module 50 may include a plurality of signal collection ports, communication ports, multiple control ports, etc., so to control corresponding electronic devices or circuit structures according to different control requirements.

The implementations of the present disclosure are described in detail above, and specific examples are used to illustrate the principles and implementations of the present disclosure. The descriptions of the above implementations are only configured to help understand the methods and core ideas of the present disclosure. For those skilled in the art, based on the ideas of the present disclosure, there will be changes in the specific implementations and application scope. In summary, the content of this specification should not be construed as limiting the present application.

What is claimed is:

1. An electric tool power supply having a vehicle starting function comprising:
    a power supply component, configured to store and provide electrical energy;
    a first output interface, electrically coupled to the power supply component, wherein the power supply component is configured to provide operating voltage for an electric tool through the first output interface when the electric tool power supply is installed on the electric tool; and
    a second output interface, electrically coupled to the power supply component, wherein the power supply component is configured to output instantaneous large-current to a starter of a vehicle through the second output interface when the electric tool power supply is installed on the vehicle, so as to start the starter.

2. The electric tool power supply of claim 1, wherein the power supply component comprises a common terminal, a first output terminal, a second output terminal, a first battery pack, and a second battery pack, wherein the first battery pack and the second battery pack are coupled in series; wherein the first battery pack is electrically coupled between the common terminal and the second output terminal, and the second battery pack is electrically coupled between the first output terminal and the second output terminal;
    the first output interface comprises two first connection terminals, wherein the two first connection terminals are electrically coupled to the common terminal and the first output terminal in a one-to-one correspondence; and
    the second output interface comprises two second connection terminals, wherein the two second connection terminals are electrically coupled to the common terminal and the second output terminal in a one-to-one correspondence.

3. The electric tool power supply of claim 2, wherein the first battery pack comprises a plurality of battery modules coupled in series, and the second battery pack comprises at least one battery module.

4. The electric tool power supply of claim 3, wherein the first battery pack comprises four battery modules coupled in series, and the second battery pack comprises one battery module.

5. The electric tool power supply of claim 3, wherein each battery module comprises one or more energy storage units, wherein the energy storage unit comprises one of a lead-acid battery, a nickel-hydrogen battery, a lithium iron phosphate battery, a lithium cobalt oxide battery, a lithium titanate battery, a super capacitor power battery, a lithium-ion capacitor, and a ternary polymer lithium battery.

6. The electric tool power supply of claim 5, wherein when the battery module comprises a plurality of energy storage units, the plurality of energy storage units of the battery module are coupled in series or in parallel.

7. The electric tool power supply of claim 3, further comprising:
    an equalization module, comprising a plurality of equalization units, wherein the plurality of equalization units are electrically coupled to output terminals of the plurality of battery modules of the power supply component one by one; and a control module, electrically coupled to each equalization unit for controlling an operating state of each equalization unit;

wherein when the voltage of one or more battery modules in the power supply component is higher than that of other battery modules in the power supply component, the control module turns on the equalization unit coupled to the battery module having the higher voltage, so as to perform equalization control on the voltage of the battery module having the higher voltage.

8. The electric tool power supply of claim 7, wherein the equalization unit is configured to control its corresponding battery module to discharge when the equalization unit is turned on; the control module is configured to control the equalization module to perform equalization control on the voltage of the battery module having the higher voltage during a charging process of the power supply component.

9. The electric tool power supply of claim 7, wherein when the control module detects that the voltage of the battery module having the higher voltage is equal to that of the other battery modules in the power supply component, the control module controls the corresponding equalization unit to stop working.

10. The electric tool power supply of claim 2, further comprising a conversion module electrically coupled between the second output terminal of the power supply component and one of the second connection terminals of the second output interface, wherein the conversion module is configured to convert the electric energy output by the power supply component into instantaneous large-current when receiving a starting signal, and output the instantaneous large-current to the starter through the second output interface, to enable the starter to start the vehicle.

* * * * *